United States Patent [19]

Falkner et al.

[11] Patent Number: 5,525,445
[45] Date of Patent: *Jun. 11, 1996

[54] RECORDING ELEMENT HAVING A CROSSLINKED POLYMERIC LAYER

[75] Inventors: Catherine A. Falkner, Rochester; John J. Fitzgerald, Clifton Park; Dennis J. Savage; Paul D. Yacobucci, both of Rochester, all of N.Y.

[73] Assignee: Eastman Kodak Company, Rochester, N.Y.

[*] Notice: The term of this patent shall not extend beyond the expiration date of Pat. No. 5,451,495.

[21] Appl. No.: 459,248

[22] Filed: Jun. 2, 1995

Related U.S. Application Data

[62] Division of Ser. No. 290,256, Aug. 15, 1994, Pat. No. 5,451,495.

[51] Int. Cl.$^6$ .............................. G03G 5/00; G03L 1/04
[52] U.S. Cl. .............................. 430/17; 430/18; 430/31; 430/272.1; 430/284.1; 430/531
[58] Field of Search .............................. 430/531, 17, 28, 430/31, 39, 495, 284, 272, 927, 18, 73; 428/149, 161; 525/453, 477, 446, 472, 474

[56] References Cited

U.S. PATENT DOCUMENTS

| | | |
|---|---|---|
| 4,463,129 | 7/1984 | Shinada et al. . |
| 4,707,515 | 11/1987 | Gilch et al. . |
| 4,758,624 | 7/1988 | Sekiguchi et al. . |
| 4,808,709 | 2/1989 | Takago et al. . |
| 5,219,928 | 6/1993 | Stofko et al. . |

FOREIGN PATENT DOCUMENTS 171986  10/1989  European Pat. Off. .

Primary Examiner—Thorl Chea
Attorney, Agent, or Firm—Robert A. Gerlach

[57] ABSTRACT

A recording element having at least one layer comprising a crosslinked polymer having polymeric backbone moieties and crosslinking moieties, the polymeric backbone moieties containing tertiary nitrogen atoms, the crosslinking moieties connecting polymeric backbone moieties at the teritary nitrogen atoms by conversion of the tertiary nitrogen atoms to quaternary amine, the crosslinking moiety having the structure

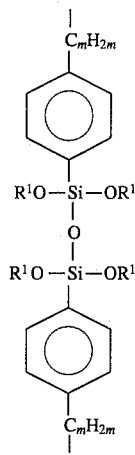

where R' is independently alkyl or aryl and m is an integer of from 1 to 10.

8 Claims, No Drawings

RECORDING ELEMENT HAVING A CROSSLINKED POLYMERIC LAYER

This is a Divisional of application Ser. No. 08/290,256, filed Aug. 15, 1994, U.S. Pat. No. 5,451,495.

BACKGROUND OF THE INVENTION

1. Field of the Invention

This invention relates to recording elements and more particularly to photographic image recording elements having at least one layer containing a crosslinked polymer providing improved physical properties.

In addition, the invention relates to a method of making such improved recording elements.

2. Description of Related Art

Because of the sensitive nature of recording elements, particularly image recording elements and most particularly photographic image recording elements, it is an ongoing quest to find improved materials having physical properties that are compatible with the nature of the imaging element while at the same time providing improved physical properties especially with respect to abrasion resistance. While the invention is applicable to all types of recording elements, such as magnetic elements, optical disks, etc., it is especially applicable to photographic image recording elements. Therefore, throughout the remainder of this specification the invention will be described with respect to photographic elements. However, it is to be understood that the invention is applicable to all types of recording elements.

During the manufacture of photographic elements, for example, the film in various stages of completeness of manufacture is engaged by numerous surfaces including planar surfaces, rollers, and the like, and the film is rolled into huge rolls one layer upon the other for storage during the course of manufacture. Once a photographic film has completed the course of manufacture, it is still subjected to various forces in the exposure stage of its life including physical handling by the photographer, engagement of various surfaces in the various types of cameras in which it is employed and finally during the development stage when it can be subjected to numerous contacts in various types of development apparatus. During all of these operations, injury can be sustained by the film which will be demonstrated in the final product; thereby rendering the product, the image contained thereon, either inferior or useless.

Therefore, there is a need in the imaging art and particularly in the photographic arts to manufacture elements that are extremely resistant to any form of deterioration, especially with regard to contact with other materials including transport materials for moving the film from one location to another because of the damage that is likely to occur in these areas. Also, there is a need for photographic elements having at least one layer containing a crosslinked polymeric material that is highly abrasion-resistant, such as overcoat layers, subbing layers, transparent magnetic recording layers, the binder employing crosslinked polymeric material in accordance with this invention. In addition, there is a need for polymers for use in recording layers wherein a material having a greatly enhanced $T_g$ and modulus is required.

SUMMARY OF THE INVENTION

The invention contemplates a recording element having at least one layer comprising a crosslinked polymer having polymeric backbone moieties and crosslinking moieties, the polymeric backbone moieties containing tertiary nitrogen atoms, the crosslinking moieties connecting polymeric backbone moieties at the tertiary nitrogen atoms, the crosslinking moiety having the structure:

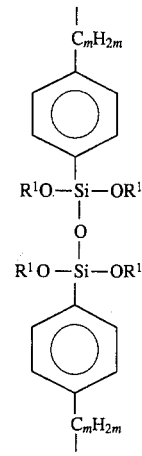

where R' is independently alkyl or aryl and m is an integer of from 1 to 10.

The invention also contemplates a method of making the crosslinked polymer by reacting a polymeric tertiary amine containing linear or branched polymer with a trialkoxysilylbenzyl halide or triaryloxysilybenzyl halide and then subjecting the product thereof to moisture.

DETAILED DESCRIPTION OF THE INVENTION

The invention contemplates a recording element, having at least one layer containing a crosslinked polymer having polymeric backbone moieties and crosslinking moieties that join the polymeric backbone moieties at tertiary nitrogen atoms contained in the polymeric backbone moiety. In this regard, the polymeric backbone moiety preferably should contain from about 1 to about 10 mole percent of tertiary nitrogen atoms.

The invention contemplates any and all types of polymeric backbone moieties containing tertiary nitrogen atoms. The tertiary nitrogen atoms may be present within the polymeric backbone or on pendant groups attached to the polymeric backbone. The invention is applicable to linear polymers having polymeric backbone moieties so long as they contain tertiary nitrogen atoms.

Suitable polymers containing tertiary nitrogen atoms include polycondensation polymers, such as, polyesters, polyethers, polythioethers, polyurethanes, polyamides, and the like; polyaddition polymers include addition products of ethylenically unsaturated monomers which contain tertiary nitrogen atoms and the like.

Suitable polyesters include those prepared employing glycols, a portion of which contain tertiary nitrogen atoms such as, N-methyldiethanolamine, N-butyldiethanolamine, N-oleyldiethanolamine, N-cyclohexyldiisopropylamine, N,N-dihydroxyethyl-p-toluidine, and the like. Suitable polyesteramides containing tertiary nitrogen atoms include those prepared by replacing a portion of the conventional glycol or the teritary amine containing glycol used in the preparation of the polyesters set forth above with organic diamines or amino alcohols, such as ethylene diamine, 1,4-butane diamine, 1,6-hexane diamine, tolylene diamine, 4,4'-diaminodiphenylmethane, 1,4-cyclohexylenediamine, aminoethyl alcohol, aminobutyl alcohol, aminooctyl alcohol, caprolactan, and the like.

Suitable polythioethers include condensation products of thiodiglycol with itself and with/other glycols such as ethylene glycol, 1,2 propylene glycol, and the like, and glycols containing tertiary nitrogen atoms, for example, N,N-dihydroxy p-ethyl-aniline and the like.

Suitable polyethers containing tertiary nitrogen atoms include the reaction product of an alkylene oxide, such as, ethylene oxide or propylene oxide with any of the tertiary amine containing diols set forth above for use in preparation of polyesters.

Polyaddition polymers containing tertiary nitrogen atoms include copolymers of ethylenically unsaturated monomers with tertiary amine containing unsaturated monomers such as dimethyl aminoethyl methacrylate, dimethyl aminoethyl acrylate, diethyl aminoethyl methacrylate, diethyl aminoethyl acrylate, N-methyl, N-ethyl amino ethyl acrylate, and the like. Suitable ethylenically unsaturated monomers to copolymerize with the tertiary amine containing monomers include styrene, vinyl toluene, methyl acrylate, methyl methacrylate, butyl acrylate, acryamide, and the like. Suitable addition polymers are set forth in U.S. Pat. No. 4,439,322 which is incorporated herein by reference.

While the invention is applicable for crosslinking any linear polymer containing tertiary nitrogen atoms, it is particularly applicable for the crosslinking of polyurethane polymers including polyurethane-ureas because of the presence of tertiary nitrogen atoms in many of such polymers and because of the ease with which tertiary nitrogen atoms can be incorporated into such polymers.

Polyurethane polymers are the reaction product of an organic diisocyanate with a polymeric diol and a chain extending agent. The tertiary nitrogen atoms may be present in the polymeric diol in the manner indicated previously, however, it is generally preferred to utilize a tertiary amine containing diol or diamine chain extending agent to incorporate the tertiary nitrogen atoms. The tertiary nitrogen atoms may be present in a portion of the chain extending agent and in this embodiment, other chain extending agents are used in addition to those containing tertiary nitrogen atoms. Any suitable polymeric diol may be used in the preparation of the polyurethane such as, for example, hydroxyl polyesters, hydroxyl polyesteramides, polyethylene ether glycols, dihydric polythioethers, polyacetals and the like.

Any suitable substantially linear hydroxyl polyester may be used such as, for example, the reaction product of a dicarboxylic acid and a dihydric alcohol and also polyesters prepared from lactones such as caprolactone and the like. Any suitable dicarboxylic acid may be used in the preparation of polyesters such as, for example, adipic acid, succinic acid, suberic acid, sebacic acid, oxalic acid, methyladipic acid, glutaric acid, pimelic acid, azelaic acid, phthalic acid, isophthalic acid, thiodiglycollic acid, thiodipropionic acid, maleic acid, fumaric acid, citraconic acid, itaconic acid and the like. Any suitable dihydric alcohol may be used in the reaction with the dicarboxylic acid to form a polyester, such as, for example, ethylene glycol, propylene glycol, hexanediol, bis-(hydroxy methyl cyclohexane), 1,4-butanediol, diethylene glycol, polyethylene glycol, 2,2-dimethyl propylene glycol, xylylene glycol, and the like. Any suitable polyester amide may be used by replacing some of the glycol used in the preparation of hydroxyl polyesters with an organic diamine, an amine alcohol or a lactam such as,
ethylene diamine, 1,4-butane diamine, 1,6-hexane diamine, 1,4-pentane diamine, 2,4 and 2,6-tolylene diamine, 4,4'-diamino diphenylmethane, xylylene diamine, 1,4-cyclohexane diamine, phenylene diamine, naphthalene diamine, aminoethyl alcohol, aminopropyl alcohol, aminobutyl alcohol, aminooctyl alcohol, hydroxyethyl-aminoethylether, caprolactam, Δ-valerolactam and the like.

Any suitable polyalkylene ether glycol may be used such as, for example, the condensation product of an alkylene oxide with a compound containing two active hydrogen atoms such as, for example, water, ethylene, glycol, propylene glycol, butylene glycol, amylene glycol, hydroquinone, pyrocatechol, pyrogallol, N-ethyl aminoethanol, N-methyl diethanolamine and the like. Any suitable alkylene oxide condensate may also be used such as, for example, the condensates of ethylene oxide, propylene oxide, butylene oxide, amylene oxide, styrene oxide and mixtures thereof. The polyalkylene ethers prepared from tetrahydrofuran may be used, such as, polytetramethylene ether glycols. The polyhydric polyalkylene ethers may be prepared by any known process such as, for example, the process described by Wurtz in 1859 and in the "Encyclopedia of Chemical Technology" Volume 7, pages 257 to 262, published by Interscience Publishers in 1951, or in U.S. Pat. No. 1,922,459.

Any suitable dihydric polythioether may be used such as, for example, the reaction product of one of the aforementioned aklylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(3-hydroxyethyl) phenylene dithioether and the like.

Any suitable chain extending agent may be employed in the preparation of the polyurethane polymer such as, for example, ethylene glycol, propylene glycol, 1,4-butanediol, 1,3-butane diol, 1,5-pentanediol, 1,6-hexanediol, xylyene glycol, diethylene glycol, thiodiglycol, p-phenylene-di-3-hydroxyethylether, neopentyl glycol, and the like. When the tertiary nitrogen atoms are present in the chain extending agent, any suitable compound may be employed such as, for example, N-methyldiethanolamine, N-propyl diethanolamine, N-butyldiethanolamine, N-oleyldiethanolamine, N-cyclohexyldiethanolamine, N-methyldiisopropanolamine, N-cyclohexyldiisopropanolamine, N-methylbis(2-aminoethyl)amine, N-butylbis-(3-aminopropyl)amine, N-cyclohexylbis (3-amino-propyl)amine, and the like.

Any suitable organic diisocyanate may be used in the preparation of polyurethane polymers containing tertiary nitrogen atoms in accordance with this invention, such as, for example, aliphatic, aromatic, alicyclic and heterocyclic diisocyanates including such as, for example, ethylene diisocyanate, ethylidene diisocyanate, propylene diisocyanate, butylene diisocyanate, cyclopentylene-1,3-diisocyanate, cychlohexylene-1,4-diisocyanate, cyclohexylene-1,2-diisocyanate, 2,4-tolylene diisocyanate, 2,6-tolylene diisocyanate, 4-4'-diphenyl-methane diisocyanate, 2,2 diphenylpropane-4,4'-diisocyanate, 3,3'-dimethyldiphenylmethane- 4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4, 4'-diisocyanate, dichlorohexamethylene diisocyanate, tetramethylene diisocyanate, pentamethylene diisocyanate, hexamethylene diisocyanate, 1-chlorobenzene- 2,4-diisocyanate, furfurylidene diisocyanate, isophorone diisocyanate, 2,4-diisocyanatodibenzofuran and the like.

In the preparation of the polyurethane polymer, all of the ingredients may be mixed together simultaneously and allowed to react. A suitable method is to cast the material onto a slab where it is permitted to solidify. Also, the polymeric diol and the isocyanate may be first reacted together to form a isocyanate terminated prepolymer and this prepolymer subsequently reacted with the chain extending agent to obtain a polyurethane polymer having tertiary nitrogen atoms.

Suitable polycondensation polymers containing tertiary nitrogen atoms are set forth in U.S. Pat. Nos. 4,286,022; 4,608,397; 4,271,217; 4,310,565; 4,328,282; 4,420,530; 4,182,828; 4,152,307; 4,128,538; 4,097,642; 4,054,592; 4,046,725; and 4,001,305, all of which are incorporated herein by reference.

In a preferred embodiment poly(dimethylsiloxane) blocked polyurethane elastomers are formed from the reaction in stoichiometric amounts of:

(a) an aliphatic diisocyanate and (b) a polyol selected from the group consisting of polyester based polyols, polyether polyols, polycarbonate polyols, acrylic polyols and mixtures thereof and (c) a poly(dimethylsiloxane) having the structure $$J-\underset{\underset{R_6}{|}}{\overset{\overset{R_6}{|}}{Si}}-O+\underset{\underset{R_8}{|}}{\overset{\overset{R_7}{|}}{Si}}-O\underset{x}{]}+\underset{\underset{R_{10}}{|}}{\overset{\overset{R_9}{|}}{Si}}-O\underset{y}{]}\underset{\underset{R_6}{|}}{\overset{\overset{R_6}{|}}{Si}}-J'$$

Wherein the J and J' groups are independently selected from alkyl aminopropyl, hydroxyl, alkoxy or carboxylate. Preferably, J and J' are the same. R6, R7, R8, R9, and R10 are independently aryl, alkyl, or fluoroalkyl the alkyl portion of which contains from 1 to 5 carbon atoms, and the values of X and Y are each from 0 to 400, such that X+Y is from 50 to about 400, and (d) a short chain aliphatic diol chain extender and (e) a short chain aliphatic diol which contains tertiary nitrogen, such as, any of the tertiary amine containing glycols set forth above in the preparation of polyesters. N-methyl diethanolamine is preferred.

The polysiloxane content varies optimally over a range of 1 to 10 weight percent. The overall molecular weight varies, but optimally it is from 40,000 to 100,000. The glass transition temperatures of the polymers varies.

The method in accordance with this invention contemplates the reaction of the backbone moiety with a trialkoxysilylbenzyl halide or a triaryloxysilybenzyl halide having the general formula

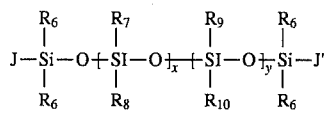

where R' represents alkyl, aryl, or mixtures thereof, X represents halogen atoms such as, fluorine, chlorine, bromine or iodine and m is an integer of from 1 to 10, with 1 being preferred. The silane substituent maybe ortho, meta, or para with para being preferred.

Representative crosslinking agents include, but are not limited to ortho, meta, and para position isomers of the following:
chloromethylphenyltrimethoxysilane
chloromethylphenyltri-n-propoxysilane
bromomethylphenyltriphenoxysilane
1-iodo-3-propylphenyltri-n-butyoxysilane
1-bromo-6-hexylphenyltriphenoxysilane
1-iodo-10-decaphenyltriethoxysilane
fluoromethylphenyltrimethoxysilane
chloromethylphenyldiethoxyphenoxysilane and the like.

Throughout the remainder of this application for simplicity in expression, the para isomer is referred to. However, this should not be considered limiting on the scope of the invention.

The trialkoxysilylbenzyl halide or a triaryloxysilybenzyl halide is reacted with the polymeric moiety containing tertiary nitrogen groups in a suitable solvent to form the quaternized polymer having the general formula

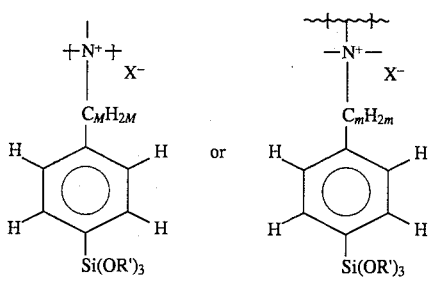

Unlike the situation in many polymeric quaternization reactions, the polymer salt does not precipitate, but rather stays in solution and is not isolated. The polymer solution is then coated on a suitable support or if a free-standing film is desired, the polymer solution is coated on a low energy surface such as Teflon and allowed to dry under ambient conditions. Ambient moisture will then cause the film to crosslink in accordance with the following equation:

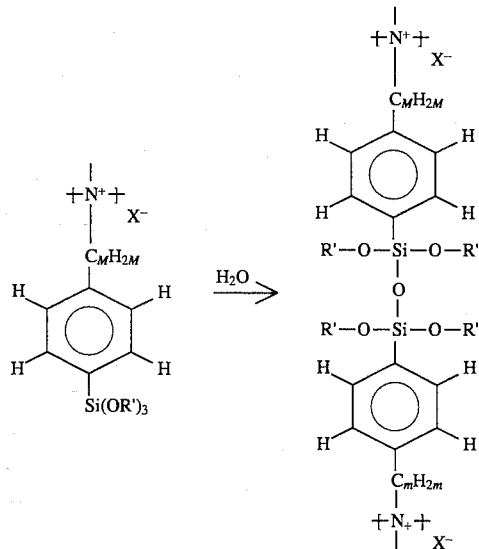

The free-standing film prepared as described above may be employed as a support for magnetic recording, photographic elements, and the like. The solution containing the reaction product of the polymeric moiety containing tertiary nitrogen atoms and the trialkoxysilylbenzyl halide or a triaryloxysilybenzyl halide may be employed as a binder for any of the layers in a recording element such as, for example, as the binder in a magnetic recording element, as the binder for any of the layers of a photographic element such as, for example, U-coat layers, intermediate layers, backing layers, antistat layers, antihalation layers, overcoat layers, and the like. Other ingredients such as, for example, antistatic agents, including vanadium pentoxide and those disclosed in U.S. Pat. Nos. 4,394,441; 4,418,141; 4,495,276; and in Research Disclosure 308119, December 1989, Section XIII; matte beads, lubricating agents, as set forth in Sections XVI and XII respectively of Research Disclosure 308119, and the like may be incorporated into any of the layers in accordance with commonly and conventionally known technology. The crosslinked polymeric compositions in accordance with this invention are particularly suitable as overcoat layers for photographic elements because of their toughness and abrasion resistant properties.

The following examples further define the invention but do not limit it. The following polymers were prepared and the polymers exemplary of the invention are summarized.

EXPERIMENTAL

The synthesis of the polydimethylsiloxane polyurethane block copolymers used the following materials:

Tetrahydrofuran (THF), dried over Type 4A Molecular Sieves for 24 hours before use.

RMDI—Desmodur W (4,4'-dicyclohexylmethane diisocyanate), sold by Miles Co.

Polycaprolactone (TONE), sold by Union Carbide.

N-Methyldiethanolamine (MDEA), sold by Aldrich Chemical Co.

Amino propyl terminated polydimethylsiloxane PS 510, sold by Huls America.

Polymer 1
Preparation of Polyurethane/Poly(dimethylsiloxane) Copolymers Containing Tertiary Nitrogen Atoms.

In a 3-neck, round bottom flask equipped with a stirrer, condenser and a nitrogen inlet, 44.28 g (0.3375 eq) of RMDI and 5 drops of dibutyltin diluarate were dissolved in 100 g of THF. The flask was heated to 40° C. with stirring and 35.78 g (0.135 eq) of Polycaprolactone (TONE 0200), 0.23 g (0.00018 eq) PS510 and 100 g of THF were added. With continued mixing, the reaction was heated to 65° C.–70° C. for approximately 3 hours. The reaction was cooled to 40° C. and 12.06 g (0.2025 eq) MDEA and 50 g THF were added followed by increased heating to 65° C.–70° C. while stirring for 24 hours at which time all the free NCO groups were consumed. The product was isolated in heptane and dried in a vacuum oven at 50° C. for 3 days.

The above reaction is a general procedure for the synthesis of a polydimethylsiloxane (PDMS)/polyurethane block copolymer. The following list shows the compositional variation of the soft segment and how these changes can produce PDMS copolymers with different properties. Each of the following reactions uses the same procedure as Example 1.

Polymer 2
{PDMS-TONE(RMDI-MDEA} with 0.25 wt % PS510 and Tone 0210
Tone 0210=56.02 g (0.135 eq)
PS 510=0.28 g (0.00022 eq)
Hard Segment/Soft Segment=50/50 wt %

Polymer 3
{PDMS-TONE(RMDI=MDEA)RMDI} with 1 wt % PS 510 and
Tone 0210
Tone 0210=56.02 g (0.135 eq)
PS 510=1.12 g (0.00089 eq)
Hard Segment/Soft Segment=50/50 wt %

Polymer 4
{PDMS-TONE(RMDI-MDEA)RMDI} with 1 wt % PS 510 and
Tone 0200
Tone 0200=35.78 g (0.135 eq)
PS 510=0.92 g (0.00074 eq)
Hard Segment/Soft Segment=60/40 wt %

Polymer 5
{PDMS-TONE(RMDI-MDEA)RMDI} with 3.00 wt % PS 510 and
Tone 0200
Tone 0200=35.78 g (0.135 eq)
PS 510=2.76 g (0.0022 eq)
Hard Segment/Soft Segment=59/41 wt %

Polymer 6
{PDMS-TONE(RMDI-MDEA)RMDI} with 3.00 wt % PS 510 and
Tone 0210
Tone 0210=56.02 g (0.135 eq)
PS 510=3.37 g (0.0027 eq)
Hard Segment/Soft Segment=49/51 wt %

Polymer 7
{PDMS-TONE (RMDI=MDEA) RMDI} with 3.00 wt % PS 510 and
Tone 0200
Tone 0200=39.75 g (0.15 eq)
PS 510=2.65 g (0.0021 eq)
Hard Segment/Soft Segment=53/47 wt %

Polymer 8
{PDMS-TONE(RMDI-MDEA)RMDI} with 3.00 wt % PS 510 and
Tone 0200
Tone 0200=35.29 g (0.1329 eq)
PS 510=2.84 g (0.0023 eq)
Hard Segment/Soft Segment=59/41 wt %

Polymer 9
{PDMS-TONE(RMDI-MDEA)RMDI} with 3 wt % PS 510 and
Tone 0200
Tone 0200=25.89 g (0.0977 eq)
PS 510=2.90 g (0.0023 eq)
Hard Segment/Soft Segment=71/29 wt %

Polymer 10
{PDMS-TONE(RMDI-MDEA)RMDI} with 3 wt % PS 510 and
Tone 0200
Tone 0200=12.75 g (0.0593 eq)
PS 510=23.1 g (0.0018 eq)
Hard Segment/Soft Segment=80/20 wt %

Polymers 1–3 and 7–10 were crosslinked into free-standing polyurethane films as illustrated in the following example:

18.0 g of the polyurethane containing 0.00107 mol tertiary nitrogen/g polymer was dissolved in 184 g THF. To 40 ml of this solution was added 0.90 g (stoichiometric amount) of p-chloromethylphenyltrimethoxysilane. The solution was stirred at room temperature for 50 minutes and then cast in a Teflon dish. The solvent was allowed to evaporate under ambient conditions.

Dynamic mechanical analysis (DMA) was used to measure the mechanical properties of the linear and crosslinked polyurethanes. The measurements were made on a Rheometrics Solid Analyzer (RSA-II) at temperatures generally between minus 150° C. and plus 200° C. The driving frequency of the instrument was 10 Hz. The sample dimensions were 7.5 mm wide, 23 mm long and approximately 0.1 mm in thickness. The storage modulus (E') (Pa) of the linear polymers and crosslinked in accordance with the invention are set forth in Table 1.

| Polymer | Storage Modulus at 130° C. |
| --- | --- |
| 1 Comparison | $<10^6$ |
| 1 Invention | $2 \times 10^8$ |
| 2 Comparison | $<10^6$ |
| 2 Invention | $9 \times 10^7$ |
| 3 Comparison | $<10^6$ |
| 3 Invention | |
| 7 Comparison | $<10^6$ |
| 7 Invention | $6 \times 10^7$ |
| 8 Comparison | $<10^6$ |
| 8 Invention | $9 \times 10^7$ |
| 9 Comparison | $<10^6$ |
| 9 Invention | $2 \times 10^8$ |
| 10 Comparison | $<10^6$ |
| 10 Invention | $3 \times 10^8$ |

The data set forth in Table 1 was extracted from DMA curves of many of the linear and crosslinked elastomers described in the examples. The results show that the physical properties of the polyurethanes are greatly improved by crosslinking in accordance with the invention. In general, the storage modulus (E') is nearly constant to nearly the Tg of the linear polymers but in each example the Tg is less than 60° C. There is then a marked decrease in E', dropping 3–4 orders of magnitude in less than 20 degrees. At higher temperatures the polymer enters into its viscous flow regime. In addition, the maximum in the loss modulus peak (E") is rather sharp for the linear polyurethanes.

After crosslinking, dramatic changes in both the storage and loss modulus are observed. The storage modulus is still constant to near the Tg of the crosslinked elastomer in each example. The most profound changes are observed above the Tg. Above the Tg the storage modulus drops only 1–2 decades. By crosslinking the polyurethane, the service temperature is extended by over 100° C.

What is claimed is:

1. A recording element having a recording layer and at least one layer comprising a crosslinked polymer having polymeric backbone moieties and crosslinking moieties, the polymeric backbone moieties containing tertiary nitrogen atoms, the crosslinking moieties connecting polymeric backbone moieties at the teritary nitrogen atoms by conversion of the tertiary nitrogen atoms to quaternary amine, the crosslinking moiety having the structure

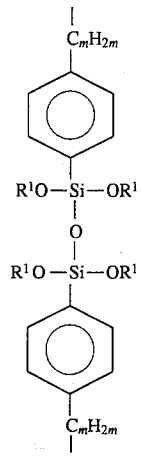

where R' is independently alkyl or aryl and m is an integer of from 1 to 10.

2. The recording element of claim 1 wherein m is 1.

3. The recording element of claim 1 wherein the tertiary nitrogen atoms are present in pendant groups.

4. The recording element of claim 1 wherein the polymeric backbone moieties are polycondensation polymers.

5. The recording element of claim 1 wherein the polymeric backbone moieties are polyaddition polymers.

6. The recording element of claim 5 wherein the polycondensation polymers are polyurethane polymers.

7. The recording element of claim 6 wherein the polyurethane polymers comprise a polymeric diol, a chain extending agent, and an organic diisocyanate.

8. The recording element of claim 7 wherein the chain extending agent contains tertiary nitrogen atoms.

* * * * *